United States Patent
De Lind Van Wijngaarden

(10) Patent No.: US 8,270,523 B2
(45) Date of Patent: Sep. 18, 2012

(54) CROSSTALK CONTROL METHOD AND APPARATUS USING A BANDWIDTH-ADAPTIVE PRECODER INTERFACE

(75) Inventor: Adriaan J. De Lind Van Wijngaarden, New Providence, NJ (US)

(73) Assignee: Alcatel Lucent, Paris (FR)

( * ) Notice: Subject to any disclaimer, the term of this patent is extended or adjusted under 35 U.S.C. 154(b) by 344 days.

(21) Appl. No.: 12/640,975

(22) Filed: Dec. 17, 2009

(65) Prior Publication Data

US 2010/0329386 A1 Dec. 30, 2010

(51) Int. Cl.
*H04B 15/00* (2006.01)

(52) U.S. Cl. ........ 375/285; 375/296; 375/346; 375/229; 375/232; 379/416; 379/417

(58) Field of Classification Search .......... 375/296, 375/285, 346, 229, 231, 232; 379/416, 417
See application file for complete search history.

(56) References Cited

U.S. PATENT DOCUMENTS

| | | | |
|---|---|---|---|
| 5,673,290 | A | 9/1997 | Cioffi |
| 6,693,992 | B2 | 2/2004 | Jones et al. |
| 6,829,293 | B2 | 12/2004 | Jones et al. |
| 6,985,521 | B1 | 1/2006 | Rezvani et al. |
| 7,218,681 | B2 * | 5/2007 | Huang ........................ 375/296 |
| 2006/0029147 | A1 | 2/2006 | Tsatsanis |
| 2009/0116582 | A1 | 5/2009 | Ashikhmin et al. |
| 2009/0180405 | A1 | 7/2009 | Ashikhmin et al. |
| 2009/0245081 | A1 | 10/2009 | Ashikhmin et al. |

FOREIGN PATENT DOCUMENTS

| | | | |
|---|---|---|---|
| WO | | 2010/149498 A1 | 12/2010 |
| WO | PCT/US2010/057710 | | 3/2011 |

OTHER PUBLICATIONS

P. Whiting et al., "Performance Results for Digital Subscriber Line Precoders," Bell Labs Technical Journal, Mar. 2008, pp. 147-161, vol. 1, No. 13.

X. Hou et al., "A Time-Domain Approach for Channel Estimation in MIMO-OFDM-Based Wireless Networks," Institute of Electronics, Information and Communication Engineers, Transactions on Communications, Jan. 2005, pp. 3-9, vol. E88-B, No. 1.

ITU Recommendation, COM 15-C 685-E, "G.vector: Advantages of Using a Startup Sequence for Joining Event," Study Group 15—Contribution 685, Infineon Technologies North American, pp. 1-3, Jan. 2008.

(Continued)

*Primary Examiner* — Phuong Phu

(74) *Attorney, Agent, or Firm* — Ryan, Mason & Lewis, LLP

(57) ABSTRACT

In a communication system, a precoder is coupled between first and second portions of each of a plurality of transmitters. The precoder is configured to receive an adaptive index representation of a scaled signal associated with the first portion of a first one of the transmitters, and to process the adaptive index representation using an adjusted precoder coefficient to generate a precompensation signal. The precompensation signal is supplied from the precoder to the second portion of a second one of the transmitters for use in precompensation of at least one signal to be transmitted by the second transmitter.

22 Claims, 11 Drawing Sheets

OTHER PUBLICATIONS

ITU Recommendation, COM 15-C 177-E, "G.vds12: Pilot Sequence Assisted Vector Channel Estimation," Study Group 15—Contribution 177, Upzide Labs, pp. 1-6, Oct. 2006.

ITU-T Recommendation G.993.2, "Very High Speed Digital Subscriber Line Transceivers 2," Series G: Transmission Systems and Media, Digital Systems and Networks, Feb. 2006, 252 pages.

U.S. Appl. No. 12/570,093, filed Sep. 30, 2009 and entitled "Crosstalk Control Using Delayed Post-Compensation in a Multi-Channel Communication System."

U.S. Appl. No. 12/493,328, filed Jun. 29, 2009 and entitled "Crosstalk Estimation and Power Setting Based on Interpolation in a Multi-Channel Communication System."

U.S. Appl. No. 12/370,148, filed in the name of G. Kramer et al. on Feb. 12, 2009 and entitled "Simultaneous Estimation of Multiple Channel Coefficients Using a Common Probing Sequence."

U.S. Appl. No. 12/352,896, filed in the name of A. Ashikhmin et al. on Jan. 13, 2009 and entitled "Power Control Using Denoised Crosstalk Estimates in a Multi-Channel Communication System."

* cited by examiner (128 → 16)

(128 → 32)

(128 → 8)

(128 → 4)

(64 → 32)

(64)

(64 → 8)

(64 → 16)

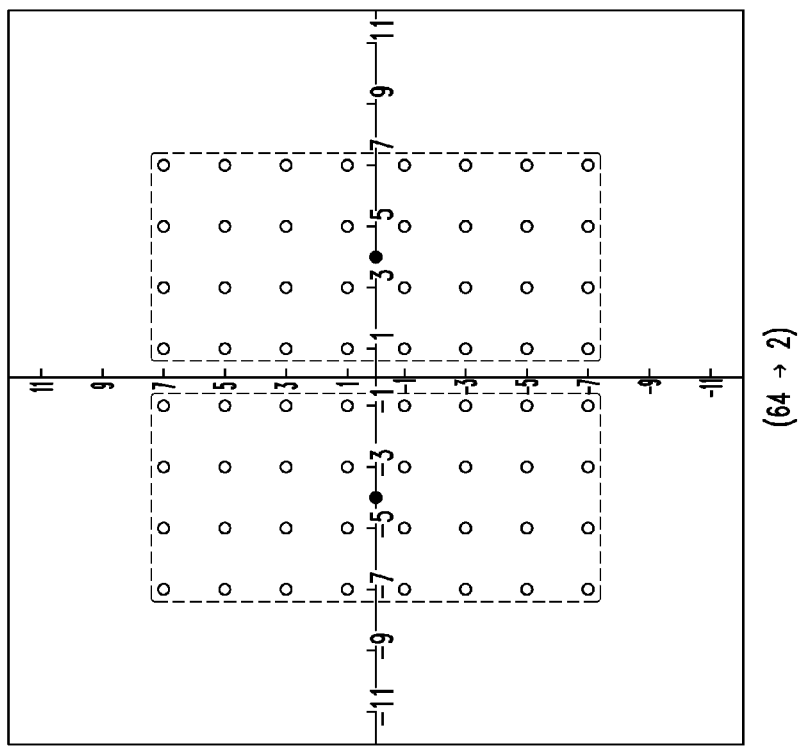
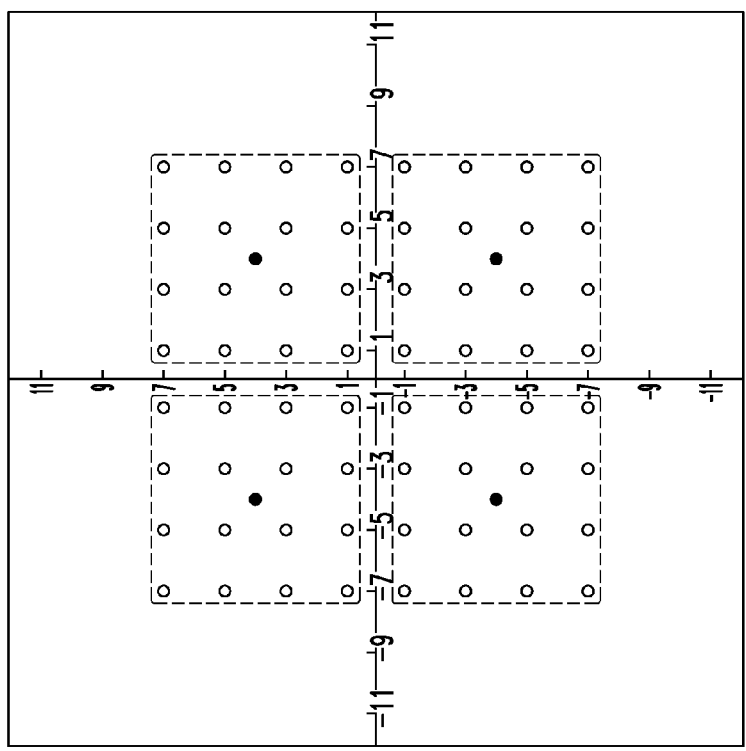

CROSSTALK CONTROL METHOD AND APPARATUS USING A BANDWIDTH-ADAPTIVE PRECODER INTERFACE

RELATED APPLICATIONS

The present invention is related to the invention disclosed in U.S. patent application Ser. No. 12/640,997, filed concurrently herewith and entitled "Method and Apparatus for Interference Post-Compensation Using a Bandwidth-Adaptive Postcoder Interface," which is commonly assigned herewith and incorporated by reference herein.

The present invention is also related to the invention disclosed in European Patent Application No. 09290482.0, filed Jun. 24, 2009 and entitled "Joint Signal Processing Across a Plurality of Line Termination Cards," which is commonly assigned herewith and incorporated by reference herein.

FIELD OF THE INVENTION

The present invention relates generally to communication systems, and more particularly to techniques for mitigating, suppressing or otherwise controlling interference between communication channels in such systems.

BACKGROUND OF THE INVENTION

Multi-channel communication systems are often susceptible to interference between the various channels, also referred to as crosstalk or inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, signals transmitted over one subscriber line may be coupled into other subscriber lines, leading to interference that can degrade the throughput performance of the system. More generally, a given "victim" channel may experience crosstalk from multiple "disturber" channels, again leading to undesirable interference.

Different techniques have been developed to mitigate crosstalk and to maximize effective throughput, reach and line stability. These techniques are gradually evolving from static or dynamic spectrum management techniques to multi-channel signal coordination.

By way of example, certain of the above-noted techniques allow active cancellation of inter-channel crosstalk through the use of a precoder. In DSL systems, the use of a precoder is contemplated to achieve crosstalk cancellation for downstream communications between a central office (CO) or another type of access node (AN) and customer premises equipment (CPE) or other types of network terminals (NTs). It is also possible to implement crosstalk control for upstream communications from the NTs to the AN, using so-called post-compensation techniques implemented by a postcoder.

One known approach to estimating crosstalk coefficients for downstream crosstalk cancellation in a DSL system involves transmitting distinct pilot signals over respective subscriber lines between an AN and respective NTs of the system. Error feedback from the NTs based on the transmitted pilot signals is then used to estimate crosstalk. Other known approaches involve perturbation of precoder coefficients and feedback of signal-to-noise ratio (SNR) or other interference information.

Crosstalk estimates are commonly utilized in situations in which it is necessary to "join" an additional line to a group of active lines in a DSL system. For example, it may become necessary to activate one or more inactive lines in a synchronization group that already includes multiple active lines, where synchronization in this context refers to alignment in time of the DMT symbols for the different lines. Such joining of an additional line may require that the precoder be adjusted accordingly in order to optimize system performance. Crosstalk estimates are also used in other situations, such as tracking changes in crosstalk over time. Thus, crosstalk estimation may be used to determine the residual crosstalk after precoding and this information can be used to adjust the crosstalk coefficients.

Conventional crosstalk reduction techniques are deficient in terms of the information transfer rate required between a given transmitter and the precoder. For example, in certain DSL systems it is known to supply signals to the precoder using an m-bit representation. More specifically, a portion of a data stream that is to be transmitted is first mapped to constellation points and then scaled in the transmitter to obtain a signal, and each signals is sent to the precoder as a sequence of complex values, with m bits being used to represent each of the real and imaginary components of the signal, such that 2m bits are required per signal per tone. Such an arrangement unduly increases the bandwidth requirements of the precoder interface, and limits the throughput performance of the system. Also, the use of the m-bit representation can introduce significant quantization error into the data that is applied to the precoder.

Accordingly, a need exists for improved precoding arrangements that can reduce the bandwidth requirements of the precoder interface while also limiting the adverse impact of quantization error on precoded signals.

SUMMARY OF THE INVENTION

Illustrative embodiments of the invention provide a bandwidth-adaptive precoder interface in which the required information transfer rate is given by a variable number of bits per tone that is less than or equal to a specified bit loading $b_k$ per tone.

In accordance with one aspect of the invention, a precoder is coupled between first and second portions of each of a plurality of transmitters in a communication system. The transmitter uses a mapper to associate a signal originating from the first portion of a first one of the transmitters with an index of a point in a scaled signal constellation that is smaller than or equal to the constellation used for producing the signal. The precoder is configured to receive and to process this index to obtain a scaled approximation of the signal that is in turn multiplied with an adjusted precoder coefficient to generate a precompensation signal. The precompensation signal is supplied from the precoder to the second portion of a second one of the transmitters that is connected to an output of the precoder for use in precompensation of at least one signal to be transmitted by the second transmitter. The precoder coefficients are adjusted by accounting for the scaling factor that was used to form the signal originating from the first portion of the transmitter. The precoder and transmitters may be implemented, for example, in an access node of the system.

The index representation of the scaled signal in at least one of the illustrative embodiments comprises an $r_k$ bit representation of the scaled signal that corresponds to $b_k$ bits for a given tone k, where $r_k \leq b_k$.

Advantageously, the illustrative embodiments significantly reduce the required information transfer rate of the interface between at least one of the transmitters and the precoder, while also providing a capability to control the resolution of the signal representation per tone over time, and to provide a controlled trade-off between bandwidth and accuracy, thus largely avoiding the quantization error issues associated with the conventional m-bit representation approach. As a result, crosstalk control can be implemented in a more efficient, flexible and accurate manner, and system throughput performance is improved. For example, if insufficient bandwidth is available on a given interface, one can selectively reduce the precision for certain tones.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for pre-compensation or other types of crosstalk control in such systems. The crosstalk control may be applied substantially continuously, or in conjunction with joining subscriber lines or other communication channels to a group of active channels in such systems, tracking changes in crosstalk over time, or in other line management applications. It should be understood, however, that the invention is not limited to use with the particular types of communication systems and crosstalk control applications disclosed. The invention can be implemented in a wide variety of other communication systems, and in numerous alternative crosstalk control applications. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc. The techniques are thus applicable to other types of orthogonal frequency division multiplexing (OFDM) systems outside of the DSL context, as well as to systems utilizing higher order modulation in the time domain.

Figure 1:
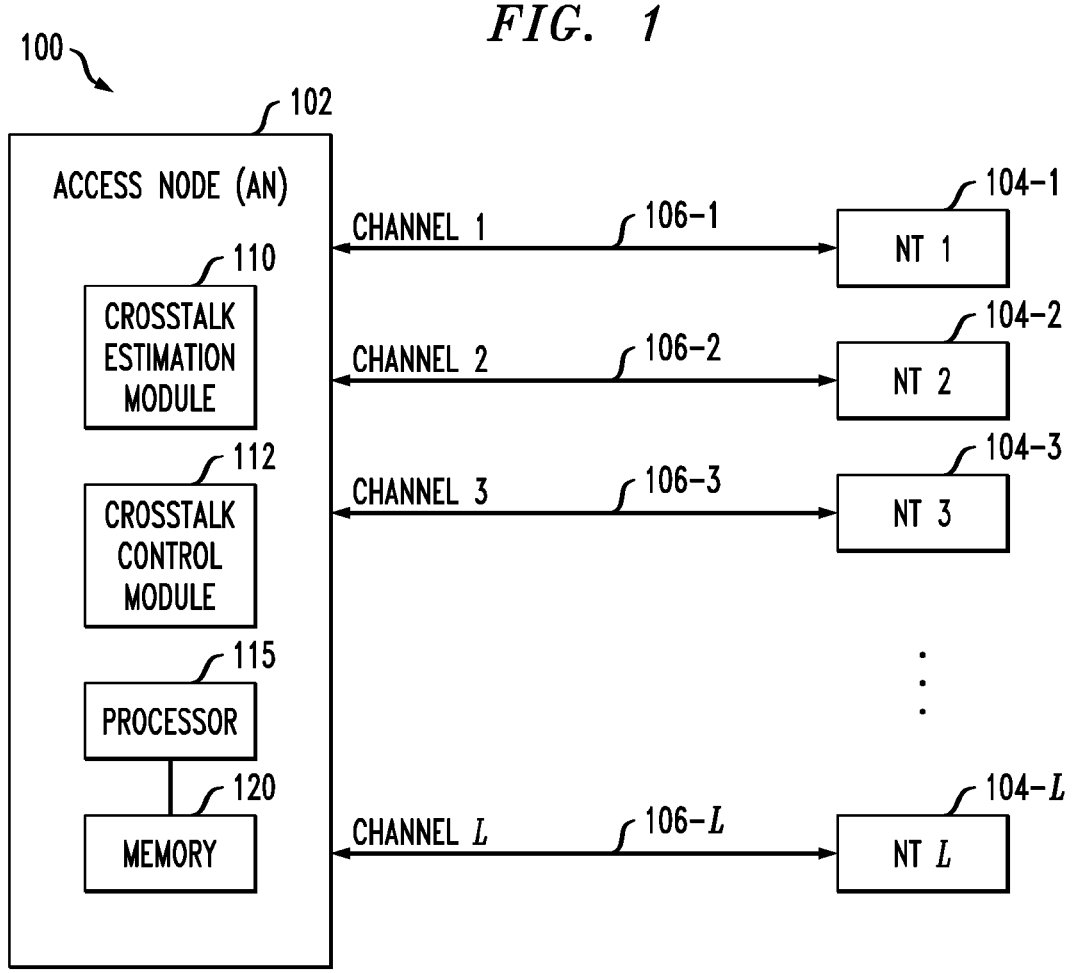
FIG. 1 is a block diagram of a multi-channel communication system in an illustrative embodiment of the invention.

FIG. 1 shows a communication system 100 comprising an access node (AN) 102 and network terminals (NTs) 104. The NTs 104 more particularly comprises L distinct NT elements that are individually denoted NT 1, NT 2, . . . NT L, and are further identified by respective reference numerals 104-1, 104-2, . . . 104-L as shown. A given NT element may comprise, by way of example, a modem, a computer, or other type of communication device, or combinations of such devices. The access node 102 communicates with these NT elements via respective channels 106-1, 106-2, . . . 106-L, also denoted Channel 1, Channel 2, . . . Channel L.

As indicated previously herein, in an embodiment in which system 100 is implemented as a DSL system, the AN 102 may comprise, for example, a central office (CO), and the NTs 104 may comprise, for example, respective customer premises equipment (CPE) elements. The channels 106 in such a DSL system comprise respective subscriber lines. Each such subscriber line may comprise, for example, a twisted-pair copper wire connection. The lines may be in the same binder or in adjacent binders, such that crosstalk can arise between the lines. Portions of the description below will assume that the system 100 is a DSL system, but it should be understood that this is by way of example only.

In an illustrative DSL embodiment, fewer than all of the L lines 106-1 through 106-L are initially active lines, and at least one of the L lines is a "joining line" that is to be activated and joined to an existing group of active lines. The initially active lines are an example of what is referred to herein as a "group" of active lines. Such a group may be, for example, a synchronization group, which may also be referred to as a precoding group or a vectored group, or any other type of grouping of active lines.

Communications between the AN 102 and the NTs 104 include both downstream and upstream communications for each of the active lines. The downstream direction refers to the direction from AN to NT, and the upstream direction is the direction from NT to AN. Although not explicitly shown in FIG. 1, it is assumed without limitation that there is associated with each of the subscriber lines of system 100 an AN transmitter and an NT receiver for use in communicating in the downstream direction, and an NT transmitter and an AN receiver for use in communicating in the upstream direction. A given module combining an AN transmitter and an AN receiver, or an NT transmitter and an NT receiver, is generally referred to herein as a transceiver. The corresponding transceiver circuitry can be implemented in the AN and NTs using well-known conventional techniques, and such techniques will not be described in detail herein.

The AN 102 in the present embodiment comprises a crosstalk estimation module 110 coupled to a crosstalk control module 112. The AN utilizes the crosstalk estimation module to obtain crosstalk estimates for respective ones of at least a subset of the lines 106. The crosstalk control module 112 is used to mitigate, suppress or otherwise control crosstalk between at least a subset of the lines 106 based on the crosstalk estimates. For example, the crosstalk control module may be utilized to provide pre-compensation of downstream signals transmitted from the AN to the NT. Such pre-compensation is implemented using a precoder, an example of which will be described in conjunction with FIG. 2.

The crosstalk estimation module 110 may be configured to generate crosstalk estimates from error samples, SNR values or other types of measurements fed back to the AN 102 from the NTs 104. It should be noted that the term SNR as used herein is intended to be broadly construed so as to encompass other similar measures, such as the signal-to-interference-plus-noise ratios (SINRs) that are utilized in certain techniques disclosed herein.

In other embodiments, crosstalk estimates may be generated outside of the AN 102 and supplied to the AN for further processing. For example, such estimates may be generated in the NTs 104 and returned to the AN for use in precoding, post-compensation, or other crosstalk control applications.

The crosstalk estimates may be more generally referred to herein as crosstalk channel coefficients, crosstalk cancellation coefficients, or simply crosstalk coefficients.

The crosstalk estimation module 110 may incorporate interpolation functionality for generating interpolated crosstalk estimates. Examples of interpolation techniques that may be utilized with the present invention are disclosed in U.S. patent application Ser. No. 11/934,347, filed Nov. 2, 2007 and entitled "Interpolation Method and Apparatus for Increasing Efficiency of Crosstalk Estimation," which is commonly assigned herewith and incorporated by reference herein.

The AN 102 may also or alternatively be configured to implement a technique for channel estimation using linear-model interpolation. In implementing such a technique, the AN transmits the pilot signals over respective ones of the lines 106. Corresponding measurements such as error samples or SNR values are fed back from the NTs to the AN and utilized to generate crosstalk estimates in crosstalk estimation module 110. The AN then performs precoding or otherwise controls signal transmission based on the crosstalk estimates. Additional details regarding these and other similar arrangements are described in U.S. patent application Ser. No. 12/493,328, filed Jun. 29, 2009 and entitled "Crosstalk Estimation and Power Setting Based on Interpolation in a Multi-Channel Communication System," which is commonly assigned herewith and incorporated by reference herein.

The crosstalk estimation module 110 may incorporate denoising functionality for generating denoised crosstalk estimates. Examples of crosstalk estimate denoising techniques suitable for use with embodiments of the invention are described in U.S. patent application Ser. No. 12/352,896, filed Jan. 13, 2009 and entitled "Power Control Using Denoised Crosstalk Estimates in a Multi-Channel Communication System," which is commonly assigned herewith and incorporated by reference herein. It is to be appreciated, however, that the present invention does not require the use of any particular denoising techniques. Illustrative embodiments to be described herein may incorporate denoising functionality using frequency filters as part of a channel coefficient estimation process.

The AN 102 further comprises a processor 115 coupled to a memory 120. The memory may be used to store one or more software programs that are executed by the processor to implement the functionality described herein. For example, functionality associated with crosstalk estimation module 110 and crosstalk control module 112 may be implemented at least in part in the form of such software programs. The memory is an example of what is more generally referred to herein as a computer-readable storage medium that stores executable program code. Other examples of computer-readable storage media may include disks or other types of magnetic or optical media.

It is to be appreciated that the AN 102 as shown in FIG. 1 is just one illustration of an "access node" as that telin is used herein. Such an access node may comprise, for example, a DSL access multiplexer (DSLAM). However, the term "access node" as used herein is intended to be broadly construed so as to encompass, for example, a particular element within a CO, such as a DSLAM, or the CO itself, as well as other types of access point elements in systems that do not include a CO. Other embodiments of the present invention need not be implemented in an access node, but more generally can be implemented in any communication system with more than one channel where the corresponding transmitters are able to exchange information through a precoder.

In the illustrative embodiment of FIG. 1 the lines 106 are all associated with the same AN 102. However, in other embodiments, these lines may be distributed across multiple access nodes. Different ones of such multiple access nodes may be from different vendors. For example, it is well known that in conventional systems, several access nodes of distinct vendors can be connected to the same bundle of DSL lines. Under these and other conditions, the various access nodes may have to interact with one another in order to achieve optimal interference cancellation.

Each of the NTs 104 may be configurable into multiple modes of operation responsive to control signals supplied by the AN 102 over control signal paths 224, as described in U.S. patent application Ser. No. 12/060,653, filed Apr. 1, 2008 and entitled "Fast Seamless Joining of Channels in a Multi-Channel Communication System," which is commonly assigned herewith and incorporated by reference herein. Such modes of operation may include, for example, a joining mode and a tracking mode. However, this type of multiple mode operation is not a requirement of the present invention.

An implementation of the system 100 of FIG. 1 that includes a precoder will be described below with reference to FIG. 2. Such a precoder is used for active crosstalk cancellation for downstream communications from the AN 102 to the NTs 104. However, it should be emphasized that similar techniques can be adapted for use in controlling crosstalk for upstream communications, as described in the above-cited U.S. patent application Ser. No. 12/640,997. Furthermore, the techniques disclosed herein are applicable to systems involving symmetric communications in which there is no particular defined downstream or upstream direction.

Figure 2:
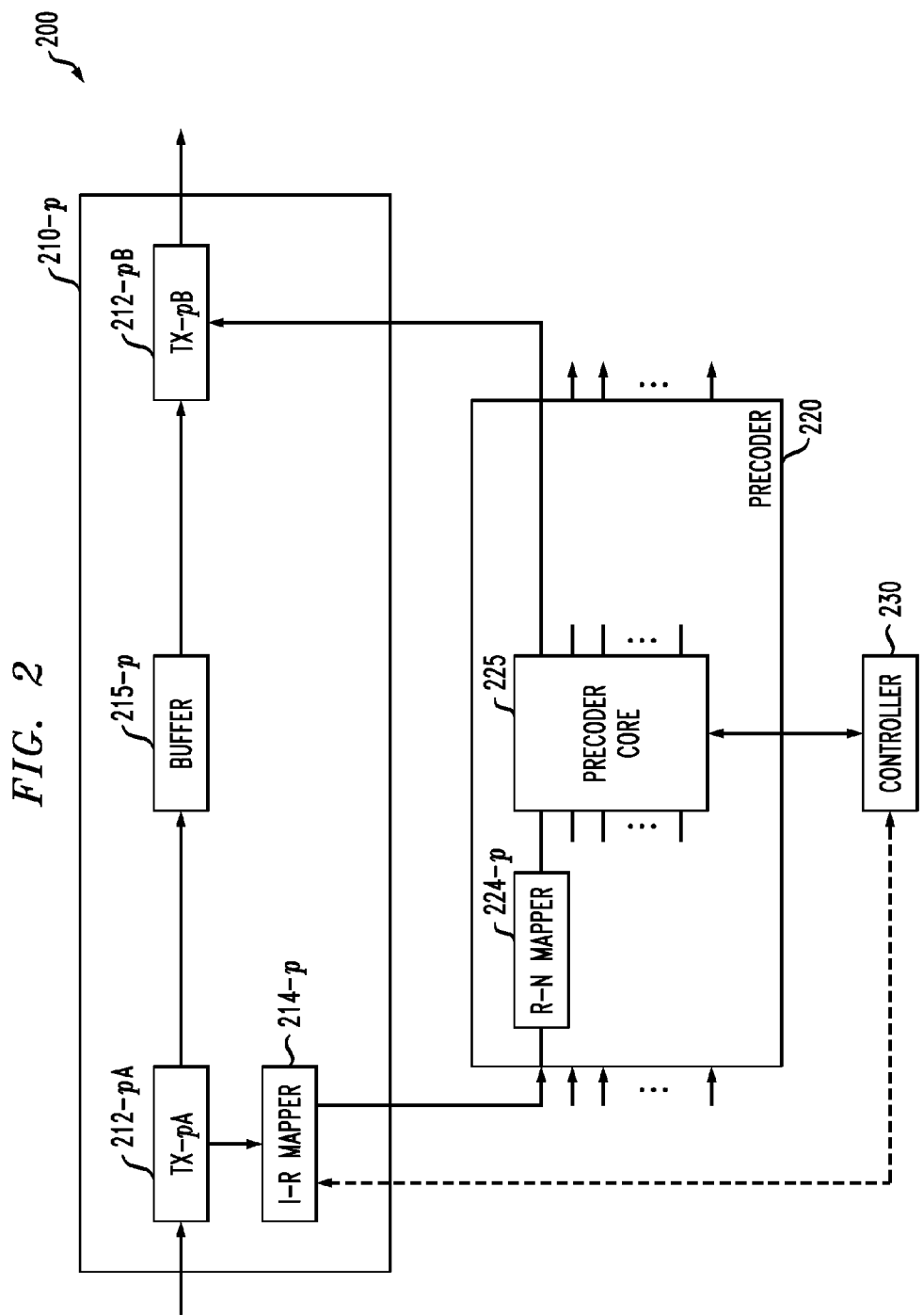
FIG. 2 shows a portion of an access node of the FIG. 1 system as configured to implement a bandwidth-adaptive interface between a transmitter and a precoder in an illustrative embodiment.

Referring now to FIG. 2, a portion 200 of the AN 102 is shown in this particular implementation as including a transmitter 210-$p$, a precoder 220 and a controller 230. The transmitter 210-$p$ is one of a set of L transmitters, p=1, 2, . . . L, of the AN 102, but only a single such transmitter is shown in FIG. 2 for clarity and simplicity of illustration. The controller 230 is coupled to the precoder 220 and the transmitters 210 for controlling the transmission of downstream signals in system 100. The transmitters generate respective signals per DMT tone that are transmitted over downstream DMT sub-channels to respective NTs 104-1 through 104-L. The precoder 220 utilizes crosstalk estimates to adjust the downstream signals prior to transmission in a manner that tends to cancel out the crosstalk introduced in traversing the downstream DMT sub-channels. Any of a wide variety of known precoding techniques may be used to implement crosstalk cancellation for multiple joining and active lines of the type described herein. Such precoding techniques are well understood by those skilled in the art and therefore will not be described in detail.

It should be noted that the portions of the transmitters 210, precoder 220 and controller 230 may be implemented in whole or in part using the processor 115 of FIG. 1. For example, portions of the functionality associated with these elements may be implemented in the form of software that is being executed in processor 115.

In practice, a given transmitter may be implemented as a single module that sends information to the precoder and/or receives precoder output intended for the corresponding line, as will be readily appreciated by those skilled in the art. For example, it is possible to have a situation in which a signal corresponding to data from a given line is sent to the precoder, but no precoder output is sent back (e.g., if the line on that tone interferes with another line, but does not itself suffer from significant interference). It is also possible to have a situation in which the line does not send the signal corresponding to its data to the precoder, but does receive a correction signal from the precoder.

Illustrative embodiments of the invention will be described herein with reference to DMT tones. However, the term "tone" as used herein is intended to be broadly construed so as to encompass not only DMT tones but also other types of tones or carriers of other multi-carrier communication systems.

It is assumed for illustrative purposes only that downstream transmission over each of the L channels 106 in the system 100 is implemented using DMT modulation with M tones per channel. The nature of the channel from one transmitter to one receiver on a particular tone can often be described by a complex coefficient, e.g., for the majority of channels encountered in DSL systems.

The AN 102 in the system 100 may be configured to obtain crosstalk estimates using any of a number of different techniques. For example, the AN may be configured to obtain crosstalk estimates using a linear-model interpolation approach of the type described in the above-cited U.S. patent application Ser. No. 12/493,328. In such an approach, the AN obtains the estimated crosstalk coefficients by first obtaining a subset of the estimated crosstalk coefficients and subsequently determining additional ones of the estimated crosstalk coefficients by applying an interpolation process to the estimated crosstalk coefficients in the subset.

The crosstalk from a disturber line into a victim line can be represented by a single complex vector which has as many components as there are DMT tones. For example, a given implementation of the system 100 may utilize 4096 DMT tones, in which case the complex vector would include 4096 components, one for each tone. Each component may be viewed as comprising a coefficient, also referred to herein as a crosstalk channel coefficient. It should be understood, however, that the set of DMT tones is typically separated into upstream and downstream tones, and some tones may not be precoded. Thus, the dimensionality of the complex vector of crosstalk channel coefficients is typically smaller than the total number of tones.

In one possible joining arrangement involving the L lines 106 previously described in conjunction with FIG. 1, lines 1 through L-1 may collectively form a group of active lines and line L may be a new joining line. It is assumed that the crosstalk channel coefficients between the active lines are known and that the precoder 220 is utilizing these coefficients to suppress the interference between the active lines. It is desired to obtain estimates of the crosstalk channel coefficients between the joining line and each of the active lines so that the precoder 220 can utilize these estimates to significantly reduce interference between the joining line and the active lines. Again, it should be appreciated that the techniques disclosed herein are applicable to other precoding contexts.

In one or more of the illustrative embodiments, it is assumed that the DSL system is generally configured in accordance with the VDSL2 standard, described in ITU-T Recommendation G.993.2, "Very high speed digital subscriber line transceivers 2," February 2006, which is incorporated by reference herein. It is further assumed that the DSL system supports cancellation of inter-channel crosstalk through the use of precoding as described in ITU-T Draft Recommendation G.993.5, "Self-FEXT Cancellation (Vectoring) for use with VDSL2 transceivers," October 2009, which is incorporated by reference herein. The dominant inter-channel crosstalk in this context is more specifically referred to as far-end crosstalk (FEXT), which generally denotes crosstalk between signals traveling in the same direction, that is, between multiple downstream signals or between multiple upstream signals. A given DSL system may provide FEXT cancellation using an approach known as vectoring, where vectoring generally denotes a physical-medium-dependent (PMD) sub-layer coordination of line signals for either or both of transmission and reception.

Returning now to FIG. 2, the transmitter 210-$p$ is more particularly illustrated as comprising at least a first portion 212-$p$A and a second portion 212-$p$B. Also included in the transmitter 210-$p$ is an index to adaptive constellation index (I-R) mapper 214-$p$ and a buffer 215-$p$. The I-R mapper 214-$p$ operates in conjunction with an adaptive index to numeric (R-N) mapper 224-$p$ to provide a bandwidth-adaptive interface between the transmitter 210-$p$ and the precoder 220. The buffer 215-$p$ provides a direct path between the first portion 212-$p$A and the second portion 212-$p$B of the transmitter 210-$p$. As indicated previously, only a particular one of the L transmitters is shown in this figure, but it is to be understood that the remaining transmitters of the AN 102 are configured in a manner similar to that shown for transmitter 210-$p$. Also, the precoder 220 is assumed to include additional R-N mappers for interfacing with respective ones of these remaining transmitters. Each of the R-N mappers drives a corresponding input of precoder core 225. Outputs of the precoder core 225 are supplied to respective second portions of the transmitters 210.

It should be noted that a given R-N mapper in the precoder 220 may process the incoming adaptive constellation indices originating from more than one transmitter 210.

In one embodiment, the system can be configured to perform partial precoding. For example, with reference again to FIG. 2, the effects of crosstalk from line p into line q can be pre-compensated by connecting the output of module TX-pA to the precoder 220 and connecting one output of the precoder to module TX-qB. If the crosstalk from other lines into line p is not being pre-compensated, it is not necessary to connect the output of the precoder with the module TX-pB. Alternatively, if the crosstalk from line p into other lines is not being pre-compensated, then it may not be necessary to connect TX-pA and the precoder.

It should also be noted without loss of generality that different connection types and other interface configurations may co-exist in a given embodiment. For instance, the interfaces between one set of transmitters and a precoder which are co-located on a first circuit board may be different than the interfaces between another set of transmitters on a different circuit board and the precoder.

The controller 230 may comprise an otherwise conventional vectoring control entity (VCE) suitably modified to implement the techniques disclosed herein.

Aspects of the present invention relate to representing the transmitter signals in a particularly efficient manner that limits the required transfer rate of the precoder input interface while preserving the necessary resolution. This is achieved in the present embodiment by configuring the transmitters 210, precoder 220 and controller 230 to utilize an alternative transmitter signal representation for the complex values that are transmitted from the transmitter 210 to the precoder 220.

The above-cited ITU-T Recommendation G.993.2 specifies that constellation points are scaled to normalize their average power, to equalize the SNR margin over the tones in use, and to achieve a frequency-dependent transmit power spectral density (PSD). The scaling required to normalize the average power is dependent only on the size of the constellation and is represented by a power normalization factor $\chi(b_k)$, where $b_k$ denotes the bit loading or the number of bits that is modulated on a subcarrier corresponding to a given tone k.

The scaling required to equalize the SNR margin over the tones in use is represented by a gain adjuster $g_k$. The scaling required to achieve frequency-dependent transmit PSD is represented by per-tone frequency-domain transmit spectrum shaping coefficients, also referred to as $tss_k$ coefficients, which provide additional shaping beyond that provided by any time-domain filters if present.

It should be understood that scaling parameters such as $b_k$, $g_k$, and $tss_k$ are not only a function of tone index k but also vary as a function of line index p. The line index of a given scaling parameter will be shown in superscript adjacent that parameter in other portions of the description herein. That is, the scaling parameters associated with line p will be more particularly denoted elsewhere herein as $b_k^{(P)}$, $g_k^{(P)}$, and $tss_k^{(P)}$. Similarly, the scaling parameters associated with line q will be denoted $b_k^{(q)}$, $g_k^{(q)}$, and $tss_k^{(q)}$. In situations in which the particular line referred to is clear from the context, or in which the reference could be to any one of multiple lines, the superscript line notation will not be explicitly shown.

For tones in the set of supported tones, also referred to as the MEDLEY set, each constellation point is scaled by the power normalization factor $\chi(b_k)$, the gain adjuster $g_k$, and the frequency-domain transmit spectrum shaping coefficients $tss_k$, to produce a scaled complex value.

The power normalization factor $\chi(b_k)$ is only dependent on the constellation, as indicated previously, and the values of the gain adjuster $g_k$ and the $tss_k$ coefficients can only change when an online reconfiguration request (OLR) is carried out. The gain adjuster $g_k$ is intended for fine gain adjustment in the range from approximately 0.1888 to 1.333. The $tss_k$ coefficients are intended for frequency-domain transmit spectrum shaping and are in the range from 0 to 1 in steps of 1/1024. The power normalization factor $\chi(b_k)=1\sqrt{T[b_k]}$ depends on the constellation only, where $$T[1\ldots 15]=[2,2,6,10,20,42,82,170,330,682,1322, 2730,5290,10922,21162].$$

Given the structure of the scaled complex value and the dynamic range of $g_k$, $tss_k$, and $\chi(b_k)$ it is clear that the scaled complex value may require a very high resolution. Any fixed-point quantization of the signal to m bits for its real and imaginary components requires m to be high, in particular if bit loading values up to 15 are supported. A typical value for m would be m=14, a lower value quickly results in significant quantization loss.

The FIG. 2 embodiment may be viewed as an example of a multi-channel precoding system 200 comprising a plurality of transmitters 210-1, . . . , 210-L, configured to transmit signals in parallel in a sequence of time intervals, each transmitter of the plurality being configured to select a signal point of a constellation responsive to receiving a portion of a data stream in one of the intervals and a precoder 220 configured to transmit corrections to one of the transmitters for the signal points selected thereby in the time intervals, the one of the transmitters being configured to add each transmitted correction to the signal points selected for data received in a corresponding one of the time intervals, wherein the precoder is configured to evaluate each correction based on a reduced precision form of the signal points selected by one of the transmitters.

The multi-channel precoding system 200 may perform precoding of parallel transmissions from a plurality of transmitters 210-1, . . . , 210-L, comprising the selection of a signal point of a constellation in response to receiving a portion of a data stream in one of the transmitters in each of a sequence of time intervals, transmitting from the one of the transmitters to a precoder 220 a scaled, configurable precision form of each selected digital signal point, and determining a precoding matrix for a sequence of sets of digital signals selected by the transmitters in parallel, each step of determining being based on the configured precision form of the digital signal point received by the precoder for a corresponding one of the time intervals and each set of digital signals including the digital signal point selected by the one of the transmitters in the corresponding one of the time intervals.

Figure 3:
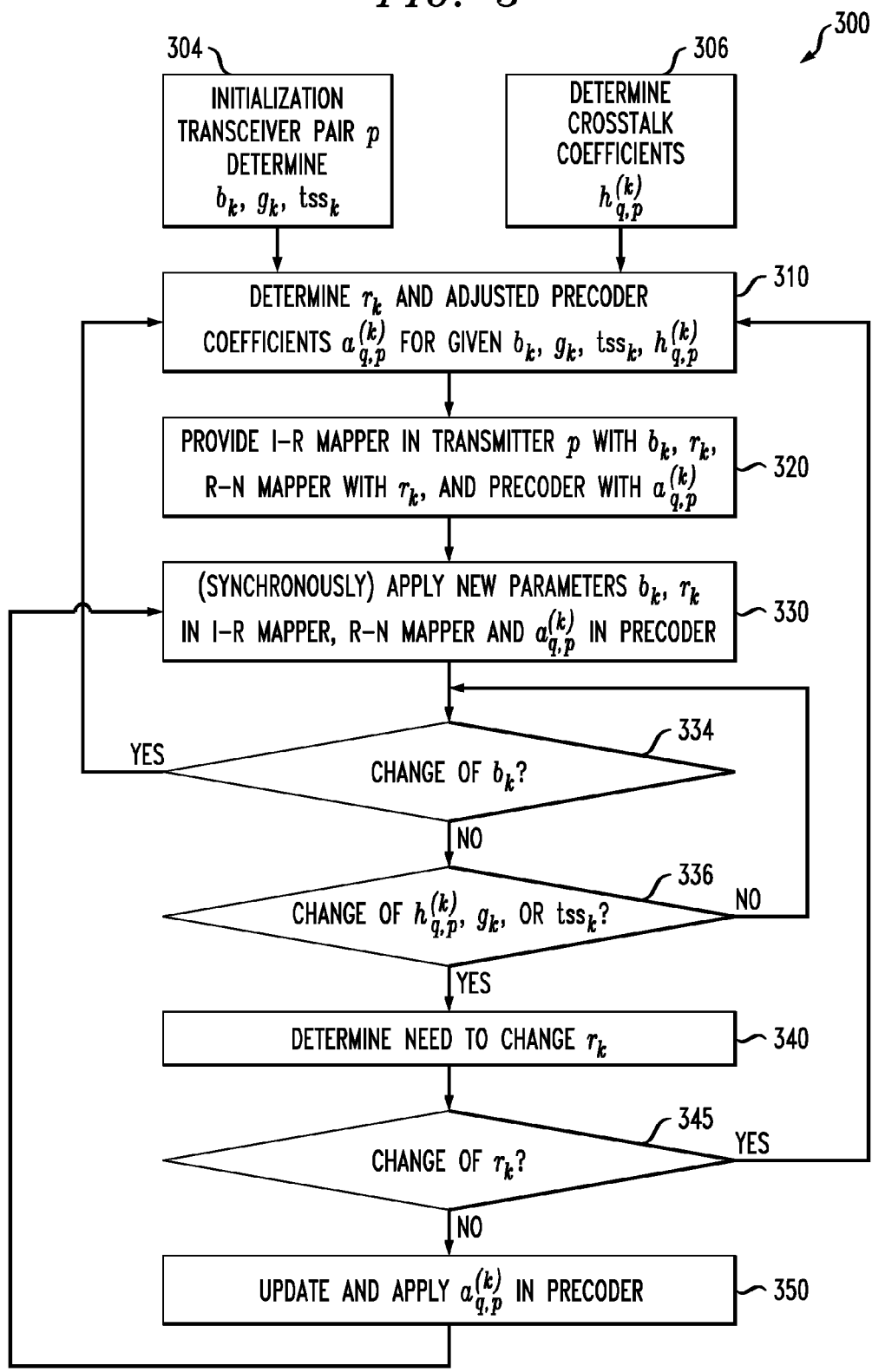
FIG. 3 is a flow diagram illustrating the operation of the bandwidth-adaptive interface of the FIG. 2 embodiment.

Referring now to the flow diagram of FIG. 3, a process 300 is shown for generation of adjusted precoder coefficients based on scaling parameters comprising the power normalization factor $\chi(b_k)$, the gain adjuster $g_k$, and the $tss_k$ coefficients, utilizing the transmitters 210, precoder 220 and controller 230 of FIG. 2. The process includes steps 304 through 350 as shown.

In step 304, a pth transceiver pair including the transmitter 210-p and its associated NT receiver is initialized and the scaling parameters $b_k$, $g_k$, and $tss_k$ are determined for line p as part of an initialization portion of the process. Also, crosstalk coefficients $h_{q,p}^{(k)}$ are determined in step 306.

It should be noted that the crosstalk coefficients $h_{q,p}^{(k)}$ are also a function of tone index k. Therefore, the notation $h_{q,p}^{(k)}$ will be used herein to denote the crosstalk coefficient from line p into line q for tone k. The superscript parenthetical tone index may be suppressed in portions of the description in order to simplify the notation.

In step 310, the parameters $b_k$, $g_k$, and $tss_k$ and the crosstalk coefficient $h_{q,p}^{(k)}$ may be used to determine the number of bits $r_k$ for the configurable signal constellation onto which the unscaled signal points are mapped. The value of $r_k$ is less than or equal to the bit loading $b_k$. Also determined in this step are adjusted precoder coefficients $a_{q,p}^{(k)}$ for given values of the parameters $b_k$, $g_k$, and $tss_k$ and the crosstalk coefficient $h_{q,p}^{(k)}$. More specifically, in the controller 230, a scaling factor given by $g_k \times tss_k \times \chi(b_k)$ is multiplied with a relative scaling factor $\xi(b_k, r_k)$ between the $b_k$-bit constellation and the $r_k$-bit constellation and also multiplied with the corresponding crosstalk coefficient $h_{q,p}^{(k)}$ to faun an adjusted precoder coefficient given by:

$$a_{q,p}^{(k)}=g_k \times tss_k \times \chi(b_k) \times \xi(b_k,r_k) \times h_{q,p}^{(k)}.$$

The adjusted precoding coefficient $a_{q,p}^{(k)}$ only needs to be updated if any of the parameters $b_k$, $r_k$, $g_k$, $tss_k$ or $h_{q,p}^{(k)}$ changes. In various mappings the adaptive constellation can be mapped in such a way that $\xi(b_k, r_k)=1$ for all or most combinations of $b_k$ and $r_k$. This has the advantage that for these combinations one does not need to recompute the adjusted precoder coefficient $a_{q,p}^{(k)}$.

In step 320, the I-R mapper 214-p in transmitter 210-p is supplied with the values $b_k$ and $r_k$ from the controller 230. Also, the R-N mapper 224-p in the precoder 220 is supplied with the values $b_k$ and $r_k$, and the precoder core 225 is supplied with the adjusted precoder coefficient(s) $a_{q,p}^{(k)}$, all from the controller 230. The new coefficients and the associated values are then applied synchronously in the I-R mapper 214-p, the R-N mapper 224-p, and the precoder 220, as indicated in step 330.

A determination is then made in step 334 as to whether or not there has been a change in the bit loading $b_k$. If there has been a change, the process returns to step 310 as indicated. Otherwise, the process moves to step 336, to determine whether or not there has been a change to the crosstalk coefficient $h_{q,p}^{(k)}$ or the parameters $g_k$ and $tss_k$. If there has been no such change, the process returns to step 334, and otherwise moves to step 340 which determines the need to change $r_k$. If there is a need to change $r_k$, and such a change is made in step 345, the process returns to step 310 as indicated. If there is no change in $r_k$, the adjusted precoder coefficient $a_{q,p}^{(k)}$ is updated and applied in the precoder, as indicated in step 350, and the process then returns to step 330.

Note that for the situation where $\xi(b_k, r_k)$ is identical for the old and new value of $r_k$ and given $b_k$, there is no need to change $a_{q,p}^{(k)}$. The value of $r_k$ may be determined by parameters such as the magnitude of the adjusted precoder coefficients $a_{q,p}^{(k)}$ for any active line $q \neq p$, and the overall bandwidth limitations of the interface between the transmitter and the precoder. For example, the values of $r_k$, of the tones k in the set of precoded tones may be chosen such that the bandwidth requirement is met at the lowest possible penalty in performance. One criterion is to determine the maximum strength of the crosstalk into another line and to use smaller values of $r_k$, when $$\max_{q \neq p} |a_{q,p}^{(k)}|$$

is small. Additional factors may be taken into account, e.g., the bit-loading in line q for tone k and the SNR value that the direct line experiences, as these parameters allow the controller to determine the effect of reducing $r_k$, on the performance.

It is to be appreciated that the particular process steps in the FIG. 3 diagram are presented by way of illustrative example only, and additional or alternative steps can be used in other embodiments.

An advantage of this technique is that through appropriate adjustment of $r_k$ one can selectively reduce the bandwidth of the interface between the first transmitter portion 212-pA and the precoder 220, without significantly impacting the overall required accuracy. Also, knowledge of $g_k$ and $tss_k$ enables the controller 230 to have more accurate information regarding the total strength of the crosstalk from line p into line q. This information can be used to determine more effectively whether or not to cancel crosstalk from line p into line q for certain tones if the computational resources within the precoder are limited.

Figure 4:
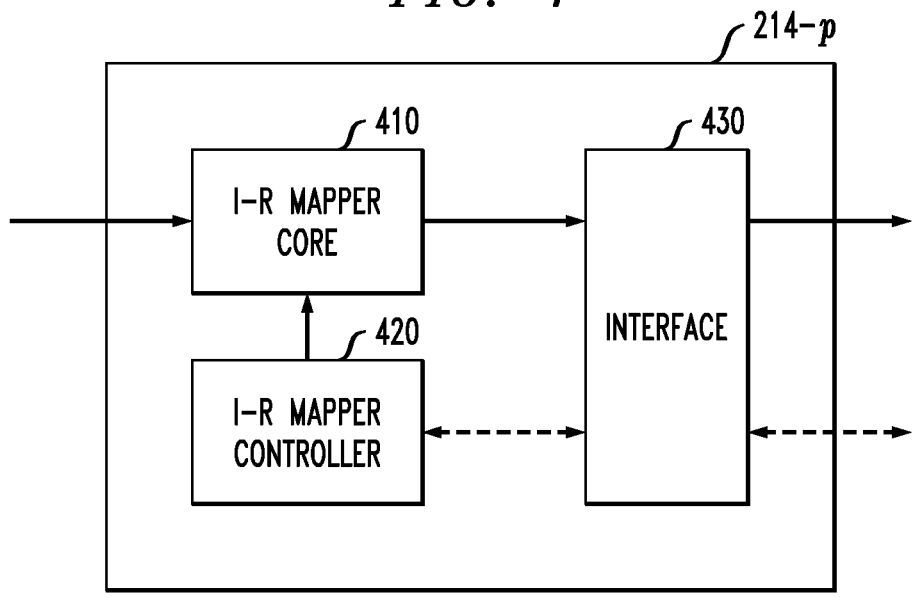
FIGS. 4 and 5 show more detailed views of respective mappers of the transmitter and the precoder in the FIG. 2 embodiment.
Figure 5:
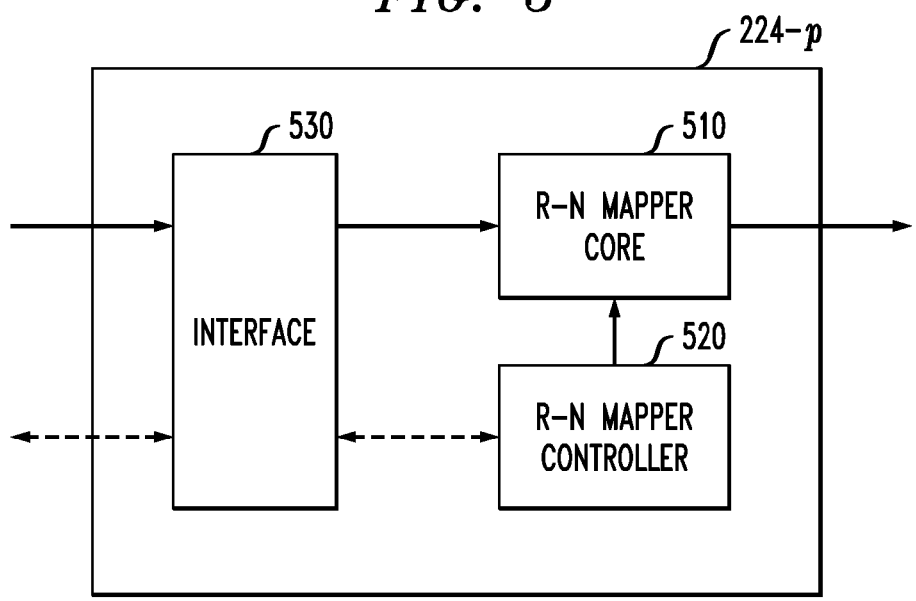

FIGS. 4 and 5 show more detailed views of the I-R mapper 214-p and the R-N mapper 224-p of FIG. 2.

The I-R mapper 214-p as shown in FIG. 4 comprises an I-R mapper core 410, an I-R mapper controller 420, and an interface 430. The I-R mapper controller 420 communicates with the controller 230 via the interface 430 as indicated by the dashed lines. Similarly, the R-N mapper 224-p of FIG. 5 comprises an R-N mapper core 510, an R-N mapper controller 520, and an interface 530. The R-N mapper controller 520 communicates with the controller 230 via the interface 530 as indicated by the dashed lines.

The I-R mapper 214-p in one implementation takes $b_k$ bits as input and it outputs the $r_k$ most significant bits. Such an arrangement is appropriate for those constellations in which truncation to the $r_k$ most significant bits will yield reasonable Euclidean distance between the reduced set of points. For other constellations, a remapping may be required, which can be implemented in a straightforward manner using a look-up table or combinatorial circuitry. There is also the possibility for vector-oriented mappings (e.g., across tones), where an entire vector gets mapped onto a larger index.

The I-R mapper controller 420 obtains the $r_k$ values from the controller 230, and obtains the $b_k$ values from elsewhere in the transmitter 210-p. In one embodiment, the I-R mapper core 410 may truncate the incoming bit sequence and forward the truncated sequence to the interface 430, which concatenates and transmits the variable length sequences.

The functionality of the R-N mapper 224-p will generally depend on the functionality of the I-R mapper 214-p and the complexity of determining a constellation point or vector that is relatively close to the original constellation point or vector in terms of Euclidean distance. Generally, the R-N mapper takes the index of the adaptive constellation and maps it onto a numeric or integer constellation point. For the constellations used in VDSL, most pairs $(b_k, r_k)$ can be dealt with by slightly modifying the standard VDSL mapper. For example, its inputs and outputs may be suitably modified. Other $(b_k, r_k)$ pairs may require the use of a look-up table or combinatorial circuitry.

Illustrative implementations of the I-R mapper 214-p and the R-N mapper 224-p will now be described, for the sub-carrier ($2^b$)-point constellations, where $1 \leq b \leq 15$, as specified in the above-cited ITU-T Recommendation G.993.2. A b-bit sequence $v_{b-1} v_{b-2} \ldots v_0$ is mapped onto a constellation point (X,Y), where X and Y are odd integers. For even values of b, X and Y are odd integers with two's-complement binary representations ($v_{b-1} v_{b-3} v_1 1$) and ($v_{b-2} v_{b-4} v_0 1$), respectively. This mapping forms a square QAM constellation with $2^k$ points. For odd values of b, where b>3, a cross-shaped constellation is constructed as follows. This mapping uses two auxiliary matrices $S=[s_{i,j}]$, and $T=[t_{i,j}]$, given by $$S = \begin{bmatrix} 0 & 0 & 1 & 1 & 0 & 0 & 0 & 0 & 1 & 1 & 0 & 0 & 1 & 1 \\ 1 & 1 & 0 & 0 & 0 & 0 & 0 & 0 & 1 & 1 & 1 & 1 & 0 & 0 \end{bmatrix}$$

and $$T = \begin{bmatrix} 0 & 0 & 0 & 0 & 1 & 0 & 1 & 0 & 1 & 1 & 1 & 1 & 1 \\ 0 & 0 & 0 & 1 & 0 & 1 & 0 & 1 & 0 & 1 & 1 & 1 & 1 \end{bmatrix}$$

as a look-up table. In this case, X and Y are odd integers with two's-complement binary representations ($s_{1,c} s_{2,c} v_{b-4} v_{b-6} v_1 1$) and ($t_{1,c} t_{2,c} v_{b-5} v_{b-7} v_0 1$), respectively, where c is the number corresponding to the five most significant bits ($v_{b-1} v_{b-2} v_{b-5}$), incremented by 1. For b=1, the points (X,Y) are given by ($1-2b_0, 1-2b_0$) and for b=3, one uses a look-up table or combinatorial circuitry.

The I-R mapper 214-p in this embodiment takes a b-bit sequence $v_{b-1} v_{b-2} v_0$ as input and outputs $v_{b-1} v_{b-2} v_{b-r}$, i.e., the r most significant bits. The R-N mapper 224-p takes this sequence as input, and maps the sequence onto a constellation (X,Y) with $2^r$ points. Let a and w be two auxiliary variables given by $a=\lfloor(b-r)/2\rfloor$ and $w=\lfloor(b-r+1)/2\rfloor$ for $2 \leq r \leq b$, and let $0_{1 \times n}$ denote the shorthand notation of a zero vector of dimension $1 \times n$. For even values of b and any $2 \leq r \leq b$, we may use the mapping where X and Y are given by the two's-complement binary representations of ($v_{b-1} v_{b-3} v_1 1 0_{1 \times a}$) and ($v_{b-2} v_{b-4} v_0 1 0_{1 \times w}$), respectively. For odd values of $b \geq 5$ and any $5 \leq r \leq b$, we may use the mapping where X and Y are given by the twos-complement binary representations ($s_{1,c}, s_{2,c}, v_{b-4} v_{b-6} \ldots v_1 1$) and ($t_{1,c} t_{2,c} v_{b-5} v_{b-7} v_0 1$), respectively.

Figure 6:
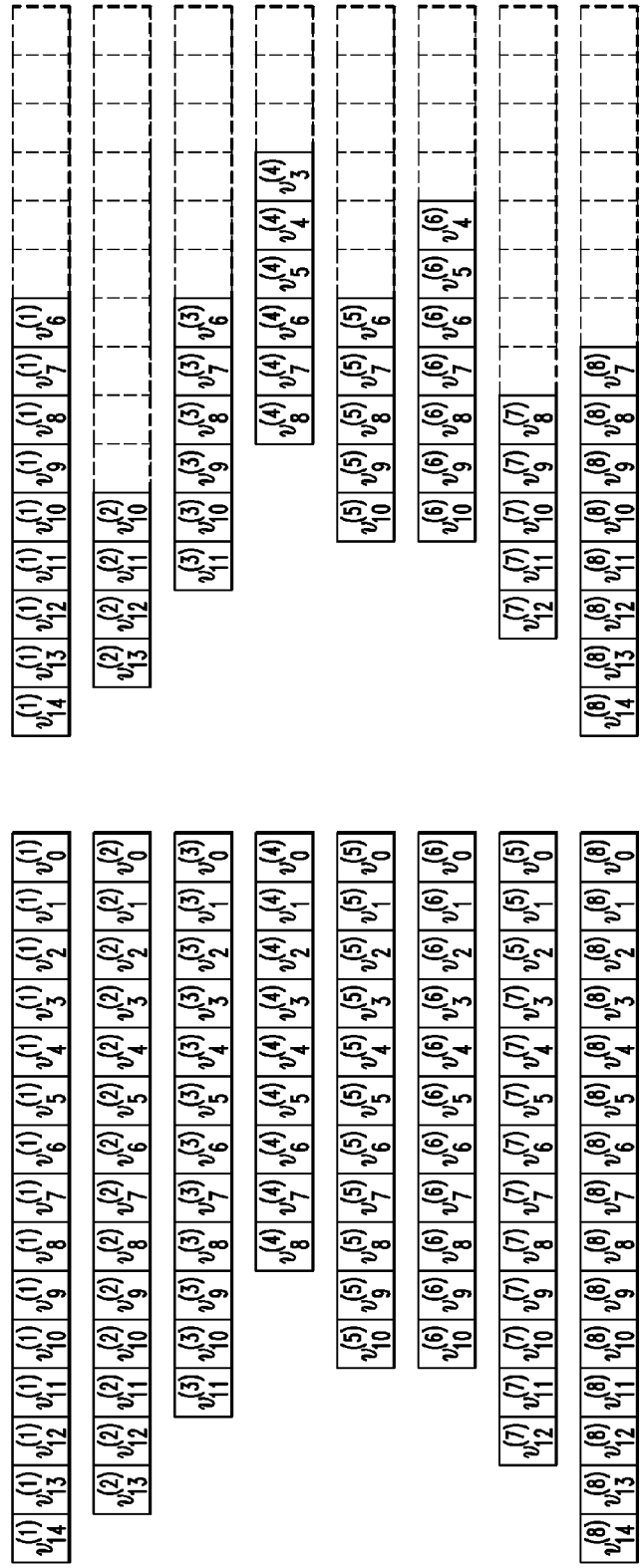
FIG. 6 is a diagram showing an example of the operation of the FIG. 4 mapper of the transmitter.

FIG. 6 shows an example illustrating the truncation procedure implemented in the I-R mapper 214-p of FIG. 4. In the example, we consider eight tones with respective bit loading values $b_k$=15, 14, 12, 9, 11, 11, 13, 15 (100 bits in total) and respective reduced constellation values $r_k$=9, 4, 6, 6, 5, 7, 5, 8 (50 bits in total). Each row includes a variable length bit sequence $v_{b_k-1}^{(k)} \ldots v_2^{(k)} v_2^{(k)} v_1^{(k)} v_0^{(k)}$ on the left as shown. The eight variable length sequences on the left are each truncated to $r_k$ most significant bits, in accordance with their respective $r_k$ values, to yield the reduced length sequences $v_{b_k-1}^{(k)} v_{b_k-2}^{(k)} \ldots v_{b_k-r_k}^{(k)}$ on the right. There is a 50% reduction in interface bandwidth when using the truncated sequences, relative to the original sequences with bit loading values $b_k$. An even greater improvement is seen relative to the previously-described conventional approach, which would require 256 bits if m=16.

FIGS. 7 and 8 show examples of respective constellation transformations providing adaptive constellations that may be used in the above-described embodiments. These transformations provide adaptive constellations that attempt to minimize the loss of Euclidean distance.

Figure 7B:
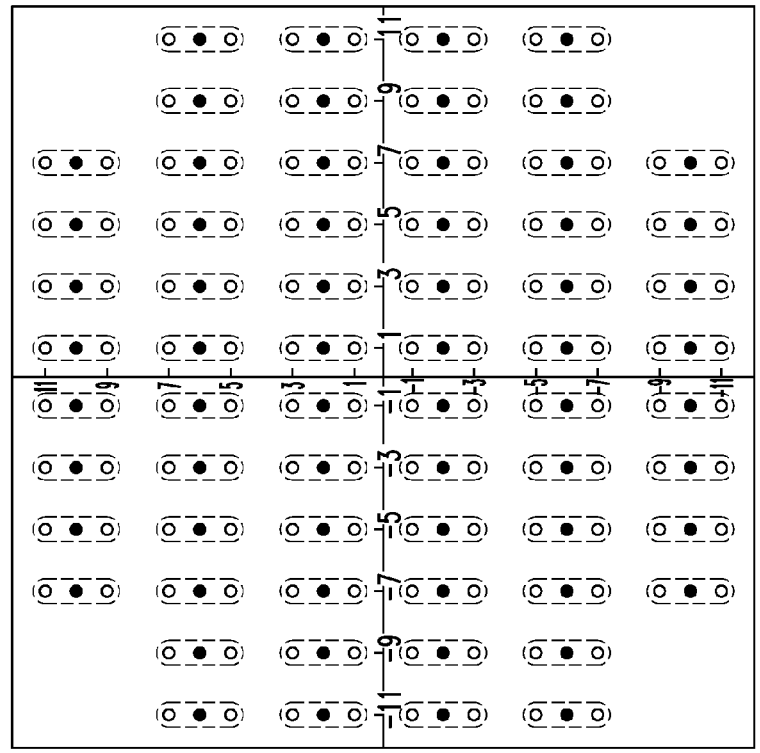
FIGS. 7 and 8 show examples of constellation transformations used in illustrative embodiments of the invention.
Figure 7A:
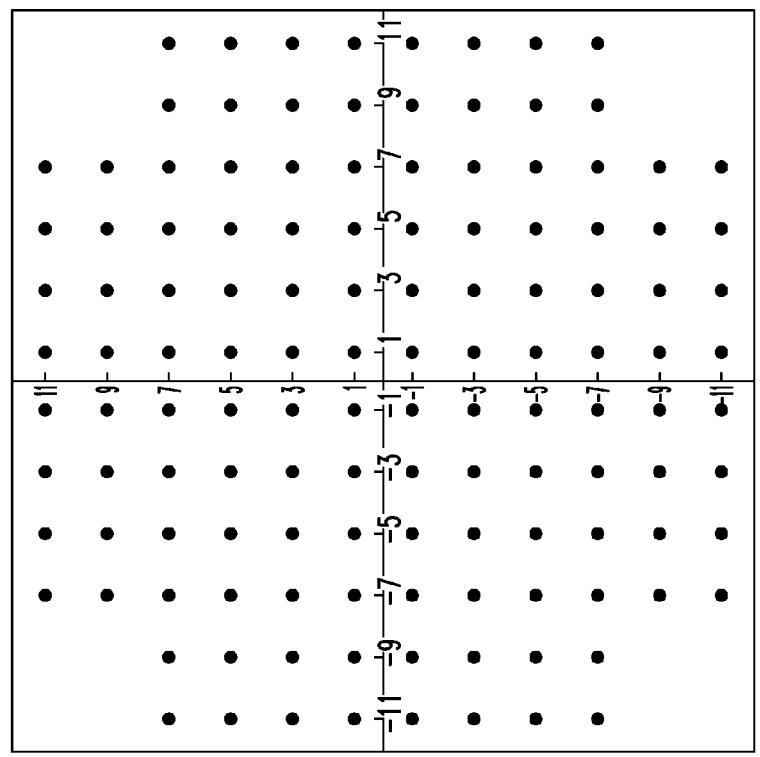
Figure 7D:
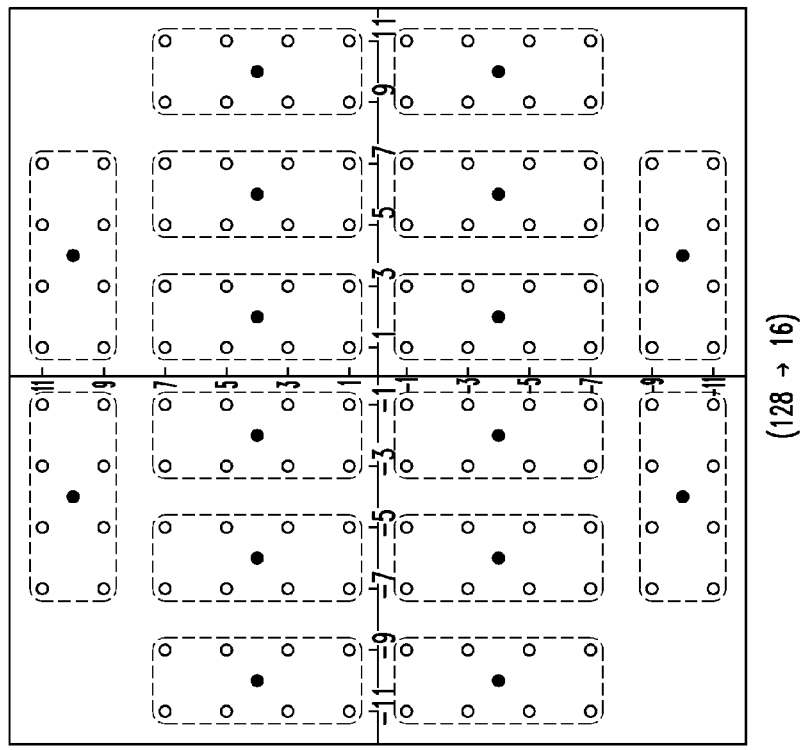
Figure 7C:
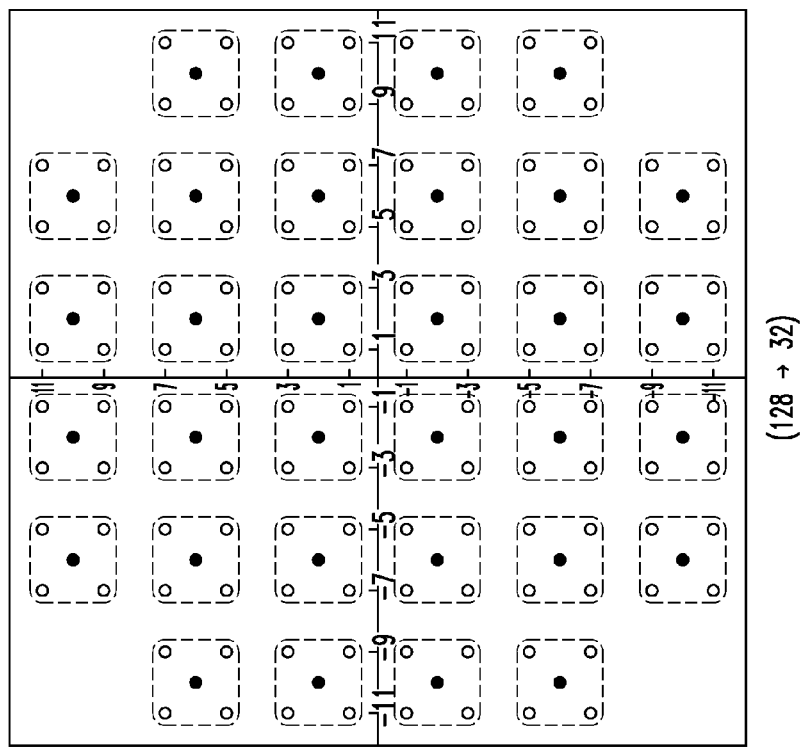
Figure 7E:
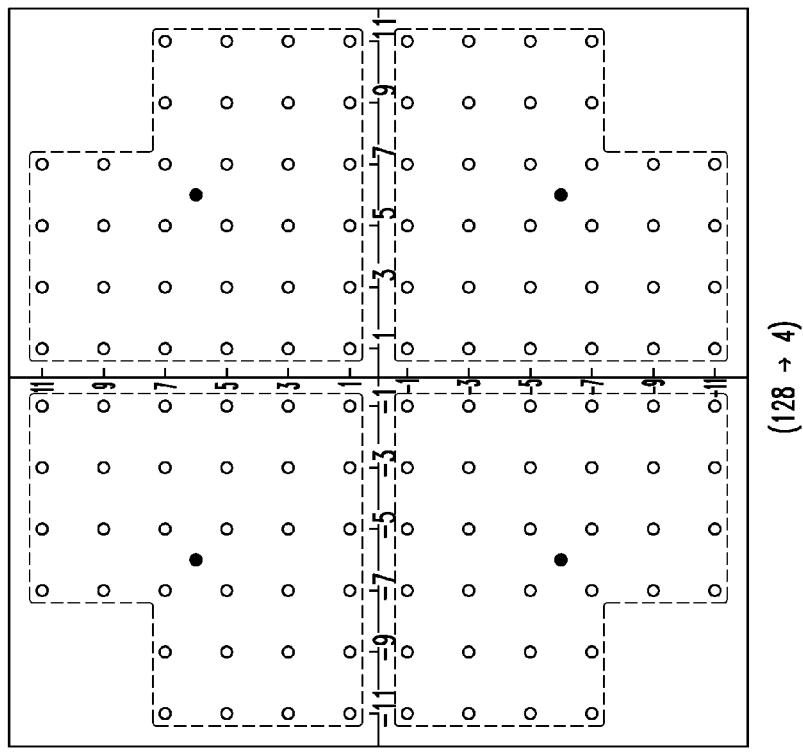
Figure 7F:
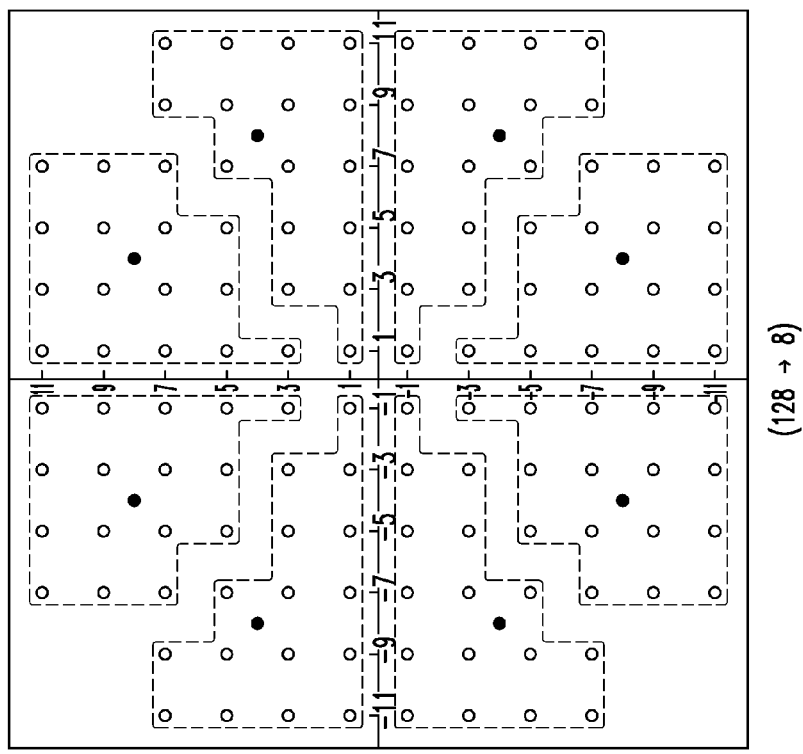

With reference to FIG. 7A, an 128-point constellation is shown. FIGS. 7B, 7C, 7D, 7E and 7F show respective reductions to 64 points, 32 points, 16 points, 8 points and 4 points, with each of these figures showing the reduced constellation points as solid circles each surrounded by a dashed box. A given dashed box contains open circles that denote the points from the original 128-point constellation in FIG. 7A that are mapped to the corresponding reduced constellation point shown as a single solid circle in that dashed box.

Figure 8B:
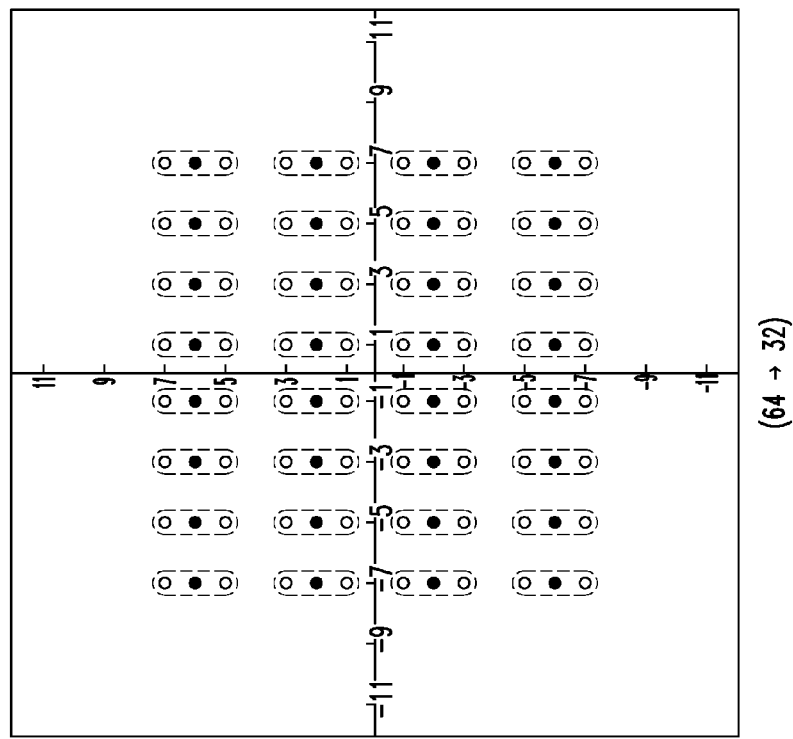
Figure 8A:
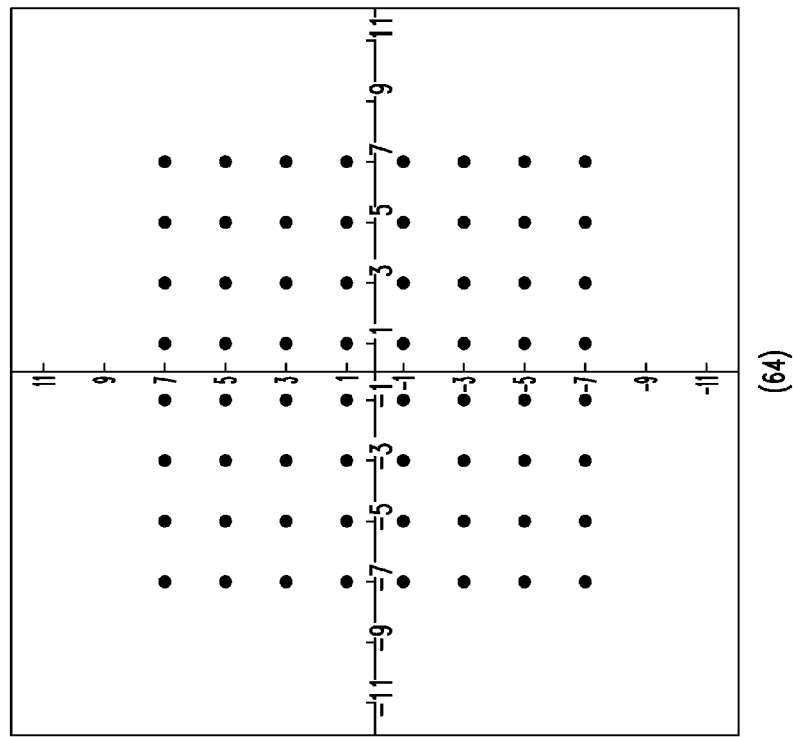
Figure 8D:
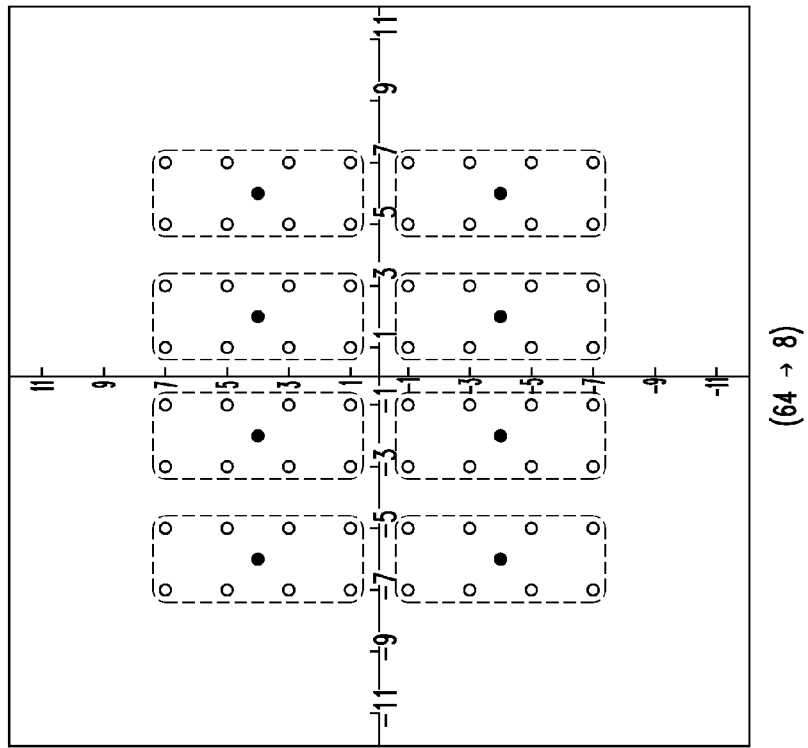
Figure 8C:
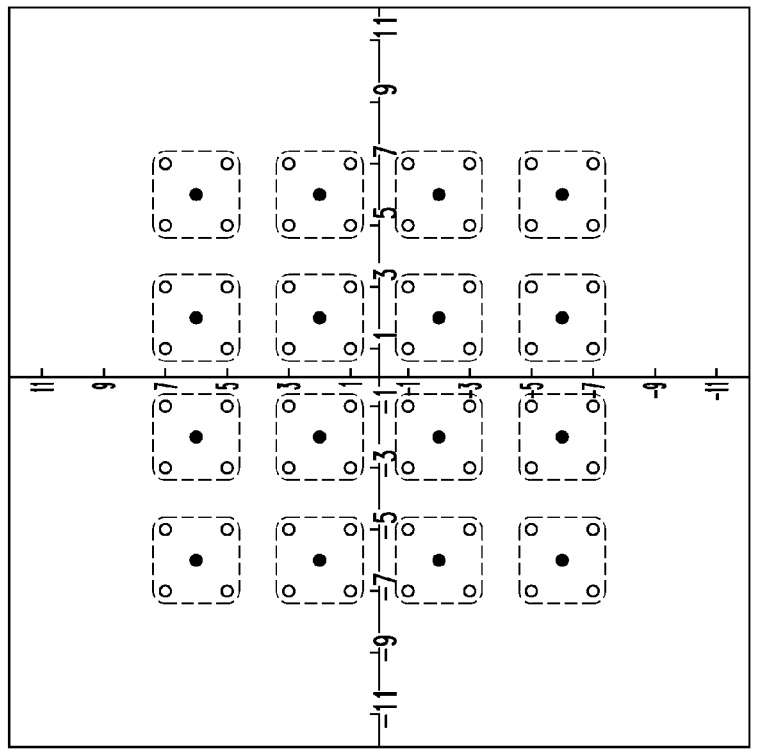

Similarly, FIG. 8A shows a 64-point constellation, and FIGS. 8B, 8C, 8D, 8E and 8F show respective reductions to 32 points, 16 points, 8 points, 4 points and 2 points, with each of these figures showing the reduced constellation points as solid circles each surrounded by a dashed box. A given dashed box contains open circles that denote the points from the original 64-point constellation in FIG. 8A that are mapped to the corresponding reduced constellation point shown as a single solid circle in that dashed box.

It is to be appreciated that these particular constellations are just examples and that the principle can be applied to other types of constellations and mappings. The same is true for the ranges disclosed herein for the illustrative scaling parameters such as $g_k$, $tss_k$, and $\chi(b_k)$.

It should also be noted that the illustrative techniques described above can be adapted for use in other contexts, including scaling at the output of the precoder, and upstream post-compensation. Examples of implementations of the latter type are disclosed in the above-cited U.S. patent application Ser. No. 12/640,997.

In the embodiments described above, one can achieve lossless transfer of information from the transmitter 210-$p$ into the precoder 220 while at the same time reducing the required information transfer rate between the transmitter and the precoder. For example, relative to the conventional approach in which 2m bits are used to represent the real and complex values of each tone, the required information transfer rate per tone can be reduced in the FIG. 2 embodiment to at least $b_k$. For m=15, this means at least a reduction per tone of a factor of 2 for $b_k$=15 up to a factor of 30 for $b_k$=1. At the same time, this embodiment avoids any loss in accuracy in the interface between the transmitter and the precoder. An additional reduction from $b_k$ to $r_k$ bits can be achieved with a controllable loss in accuracy.

Alternative embodiments of the invention can be implemented using other arrangements of access node elements. For example, it is possible to configure the transmitter portions 212-$p$A such that each maps the data into signals points but does not scale the signal. The adjusted crosstalk coefficients are generated in the controller 230 in the manner previously described, and applied to the scaled, configured-precision form of each selected signal point in the precoder 220.

As mentioned above, the illustrative embodiments assume the use of an error feedback or SNR feedback approach to channel coefficient estimation. However, the techniques of the invention can be adapted in a straightforward manner to embodiments that do not utilize error feedback or SNR feedback.

Embodiments of the present invention may be implemented at least in part in the form of one or more software programs that are stored in a memory or other processor-readable medium of AN 102 or NTs 104 of system 100. Such programs may be retrieved and executed by a processor in the AN or NT. The controller 230 may be viewed as an example of such a processor. Of course, numerous alternative arrangements of hardware, software or firmware in any combination may be utilized in implementing these and other systems elements in accordance with the invention. For example, embodiments of the present invention may be implemented in a DSL chip or other similar integrated circuit device. As another example, embodiments of the invention may be implemented using multiple line cards of an access node, with the improved precoder interfaces being utilized to facilitate the transfer of information across the line cards. In such an arrangement, different $r_k$ values may be used for different line cards. For example, consider three line cards LC1, LC2 and LC3. If line 1 of card LC1 causes substantial crosstalk for a given tone on lines of LC2 and minimal crosstalk for the given tone on lines of LC3, one can send the signal of line 1 in a higher resolution (i.e., using a higher $r_k$ value) to LC2 than to LC3.

Examples of access nodes having multiple line card arrangements that can be adapted for use in implementing embodiments of the present invention are disclosed in the above-cited European Patent Application No. 09290482.0, filed Jun. 24, 2009 and entitled "Joint Signal Processing Across a Plurality of Line Termination Cards."

It should again be emphasized that the embodiments described above are presented by way of illustrative example only. Other embodiments may use different communication system configurations, AN and NT configurations, communication channels, crosstalk estimate generation and crosstalk control process steps, depending on the needs of the particular communication application. Alternative embodiments may therefore utilize the techniques described herein in other contexts in which it is desirable to control crosstalk between multiple channels of a communication system.

In the illustrative embodiment of FIG. 2, it is assumed that all of the lines are subject to precoding. However, other embodiments need not be so configured, and one or more lines may not have associated precoding. In an arrangement of this type, the disclosed techniques may be used to measure how much crosstalk would be caused in non-precoded active lines, and a determination may then be made to reduce the power level on certain tones that are giving rise to this interference.

It should also be noted that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method comprising:
  receiving in a precoder coupled between first and second portions of a plurality of transmitters of a communication system an adaptive index representation of a scaled signal associated with the first portion of a first one of the transmitters; and
  processing the adaptive index representation in the precoder using an adjusted precoder coefficient to generate a precompensation signal;

wherein the precompensation signal is supplied from the precoder to the second portion of a second one of the transmitters for use in precompensation of at least one signal to be transmitted by the second transmitter.

2. The method of claim 1 wherein the step of processing the adaptive index representation in the precoder further comprises the steps of:
mapping the adaptive index representation of the scaled signal to a constellation point in the precoder; and
multiplying the constellation point with the adjusted precoder coefficient in the precoder to generate the precompensation signal.

3. The method of claim 1 wherein the receiving step further comprises receiving said adaptive index representation of the scaled signal as an $r_k$ bit representation of the scaled signal that corresponds to $b_k$ bits for a given tone k, where $r_k \leq b_k$.

4. The method of claim 1 further including the step of generating the adjusted precoder coefficient in a controller of an access node of the system.

5. The method of claim 4 further including the step of supplying the adjusted precoder coefficient to the precoder from a vectoring control entity of the controller.

6. The method of claim 1 further including the step of generating the adjusted precoder coefficient as a function of a corresponding crosstalk coefficient and a scaling factor of the scaled signal.

7. The method of claim 6 wherein the adjusted precoder coefficient is generated by multiplying a crosstalk coefficient $h_{q,p}^{(k)}$ by a scaling factor given by $g_k \times tss_k \times \chi(b_k) \times \xi(b_k, r_k)$ to form the adjusted precoder coefficient given by:

$$a_{q,p}(k) = g_k \times tss_k \times \chi(b_k) \times \xi(b_k, r_k) \times h_{q,p}^{(k)},$$

where $g_k$ denotes a gain adjuster for tone k, $\chi(b_k)$ denotes a power normalization factor for a given number of bits $b_k$ for tone k, $tss_k$ denotes frequency-domain transmit spectrum shaping coefficients for tone k, $\xi(b_k, r_k)$ denotes a power normalization factor between the constellations specified by $b_k$ and $r_k$, and $h_{q,p}^{(k)}$ denotes the crosstalk coefficient from line p into line q for tone k.

8. The method of claim 6 further comprising the step of updating the adjusted precoder coefficient in conjunction with at least one of a change in a constellation comprising said scaled signal, a change in the scaling factor of the scaled signal, and a change in the crosstalk coefficient.

9. The method of claim 1 wherein the receiving step further comprises receiving said adaptive index representation of the scaled signal from an index to adaptive index mapper of the first transmitter.

10. The method of claim 9 wherein the step of mapping the adaptive index representation of the scaled signal to a constellation point further comprises mapping the adaptive index representation of the scaled signal to the constellation point in an adaptive index to numeric mapper having an input coupled to an output of the index to adaptive index mapper of the first transmitter.

11. A computer-readable storage medium having embodied therein executable program code that when executed by a processor of an access node of the system causes the access node to perform the steps of the method of claim 1.

12. An apparatus comprising:
a precoder configured for coupling between first and second portions of each of a plurality of transmitters in a communication system, the precoder being configured to receive an adaptive index representation of a scaled signal associated with the first portion of a first one of the transmitters, and to process the adaptive index representation using an adjusted precoder coefficient to generate a precompensation signal that is supplied from the precoder to the second portion of a second one of the transmitters for use in precompensation of at least one signal to be transmitted by the second transmitter.

13. The apparatus of claim 12 wherein the precoder is configured to map the adaptive index representation of the scaled signal to a constellation point in the precoder, and to multiply the constellation point with the adjusted precoder coefficient in the precoder to generate the precompensation signal.

14. The apparatus of claim 12 wherein the adaptive index representation of the scaled signal comprises an $r_k$ bit representation of the scaled signal that corresponds to $b_k$ bits for a given tone k, where $r_k \leq b_k$.

15. The apparatus of claim 13 wherein said precoder comprises an adaptive index to numeric mapper configured to receive said adaptive index representation of the scaled signal from a corresponding index to adaptive index mapper of the transmitter and to generate said constellation point.

16. An apparatus comprising:
a plurality of transmitters; and
a precoder coupled between first and second portions of each of the plurality of transmitters;
wherein the precoder is configured to receive an adaptive index representation of a scaled signal associated with the first portion of a first one of the transmitters, and to process the adaptive index representation using an adjusted precoder coefficient to generate a precompensation signal that is supplied from the precoder to the second portion of a second one of the transmitters for use in precompensation of at least one signal to be transmitted by the second transmitter.

17. The apparatus of claim 16 wherein the adaptive index representation of the scaled signal comprises an $r_k$ bit representation of the scaled signal that corresponds to $b_k$ bits for a given tone k, where $r_k \leq b_k$.

18. The apparatus of claim 16 wherein the first transmitter comprises an index to adaptive index mapper configured to receive said scaled signal from the first portion of the first transmitter and to generate said adaptive index representation of the scaled signal for delivery to the precoder.

19. The apparatus of claim 16 further comprising a controller coupled to said precoder and said transmitters, said controller being configured to generate the adjusted precoder coefficient.

20. The apparatus of claim 19 wherein the controller comprises a vectoring control entity configured to supply the adjusted precoder coefficient to the precoder.

21. The apparatus of claim 16 wherein the transmitter and the precoder are implemented in an access node of a communication system.

22. The apparatus of claim 21 wherein the access node comprises a processor coupled to a memory, wherein at least a subset of the precoder operations are implemented under control of said processor.

* * * * *